June 25, 1968 I. H. WAHLBECK 3,389,745

HYDROSTATIC BEARING AND AXIAL ADJUSTING MEANS FOR THE SIMULTANEOUS ROTARY AND AXIAL MOVEMENT OF THE ROTOR IN A ROTARY REGENERATIVE AIR PREHEATER

Filed Aug. 23, 1966

INVENTOR.

Ira H. Wahlbeck

BY Wayne Lang

AGENT

United States Patent Office 3,389,745

Patented June 25, 1968

1

3,389,745

HYDROSTATIC BEARING AND AXIAL ADJUSTING MEANS FOR THE SIMULTANEOUS ROTARY AND AXIAL MOVEMENT OF THE ROTOR IN A ROTARY REGENERATIVE AIR PREHEATER

Ira H. Wahlbeck, Wellsville, N.Y., assignor to The Air Preheater Company, Inc., Wellsville, N.Y., a corporation of New York Filed Aug. 23, 1966, Ser. No. 580,557
4 Claims. (Cl. 165—9)

ABSTRACT OF THE DISCLOSURE

A rotary regenerative heat exchanger having a rotor mounted on a hydraulically actuated piston that may be simultaneously rotated and moved axially thereby to provide optimum clearance space between the rotor and its surrounding housing.

The present invention relates to rotary regenerative heat exchange apparatus and particularly to improvements in the mounting and support of such apparatus for efficient construction and optimum operation.

In heat exchangers of the rotary regenerative type as herein disclosed, a rotor carrying a mass of heat exchange material alternately between a heating fluid and a fluid to be heated is surrounded by a housing having end plates formed with openings that direct the heating fluid and the fluid to be heated to and through the rotor. To preclude the flow of either fluid through the clearance space between the rotor and the surrounding rotor housing in a way that would bypass the heat exchange material therein, it is customary to provide the rotor with circumferential and radial sealing means that bear against confronting surfaces of the end plates or other parts of the housing.

Such sealing means usually are made axially adjustable in order that the clearance space between the rotor and the confronting surface of the housing may be maintained at an optimum relationship throughout wide ranges of operating conditions and for long periods of time. This invention however contemplates an arrangement that permits adjusting the axial clearance space between the rotor and surrounding housing to an optimum by means of an axial movement of the entire rotor within the rotor housing in a manner that is both effective and inexpensive.

Simultaneously the same or similar means used to move the rotor axially to an optimum position within the rotor housing is used to support the rotor rotatively whereby the entire rotor may be easily and quickly moved axially to limit the fluid leakage past the seals while it serves as a support for rotation of the rotor.

Figure 1:
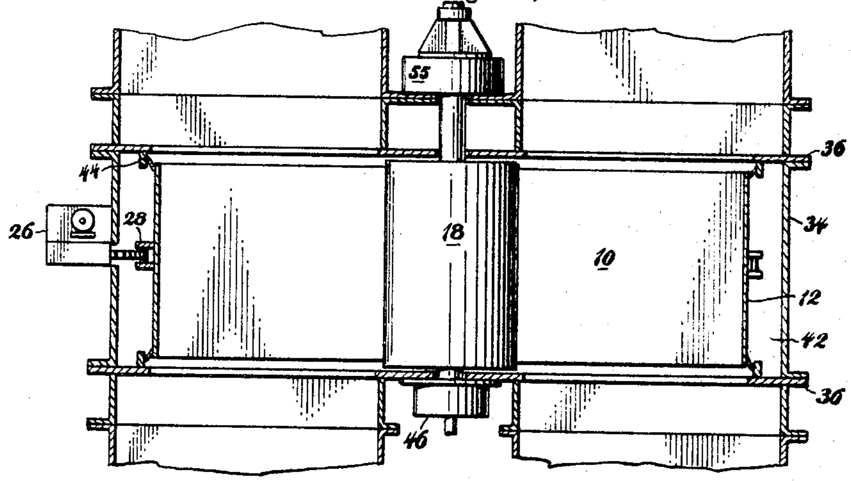
Figure 2:
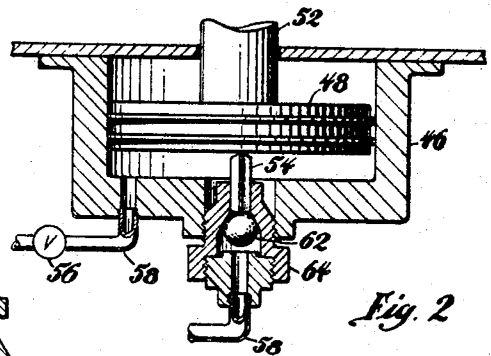
Figure 3:
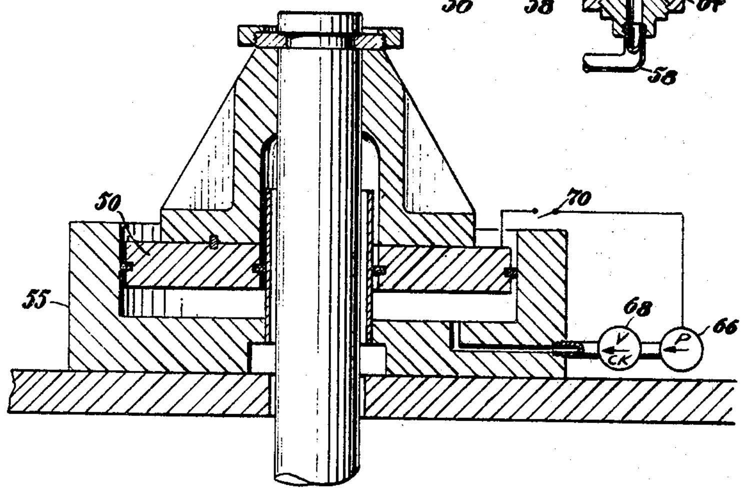

The invention will be better understood upon consideration of the following detailed description of an illustrative embodiment thereof when read in connection with the accompanying drawings in which:

FIGURE 1 is a side view of a rotary regenerative heat exchanger arranged according to the present invention, and FIGURE 2 is a view of the device of the invention when used as a positioning device or bearing at the lower end of the rotor post, and FIGURE 3 is a view of the device when used at the upper end of the rotor post.

In the drawings the numeral 10 designates a rotor having a cylindrical shell 12 divided into sector shaped compartments by radial partitions that extend outward from a pivotally supported rotor post 18. The rotor compartments contain regenerative heat exchange material adapted to first absorb heat from the heat transfer fluid entering the housing from a combustor or other source of heat. As the rotor is turned slowly about its axis by a drive motor 26 and driving means 28 the heated heat exchange material is moved into a stream of cooler air or other fluid to be heated that is admitted through the spaced passageway. After passing over the heated heat exchange material that has been moved into the passageway for cooler air and absorbing heat therefrom, the then heated air or other fluid is conveyed to a predetermined place of use.

A housing 34 encloses the rotor and is provided at opposite ends thereof with end plates 36 apertured at diametrically opposite sides to direct the heating fluid and the fluid to be heated to and through the rotor. In order that the fluid streams will not bypass the heat exchange material of the rotor by passing axially in the annular clearance space 42 between the rotor shell 12 and the housing 34 it is customary to provide sealing means 44 that effect a barrier therebetween Usually it is possible to axially adjust the sealing means to obtain a desirable relationship.

By means of this invention however the entire rotor may be moved axially within a fixed housing to provide a nearly optimum spacing arrangement between the relatively movable rotor and the surrounding rotor housing. Continuously, even while the rotor is being moved axially, the same or similar arrangement used to move the rotor thus supports it for rotative movement within the rotor housing. The same basic arrangement may be positioned to support the rotor from above or below or it may, as in the case shown in the drawing, be positioned both above and below the rotor as determined by the size, speed of rotation, motive fluid or other of the variables necessarily considered.

The arrangement which provides the rotor with its rotatable support comprises essentially a cylinder 46 axially aligned with the rotor and fixed with respect to the rotor housing 34. Inside the cylinder 46 is a piston 48 connected by means of a rod 52 to the rotor post 18 whereby the addition of fluid under pressure to the underside of the cylinder will move the piston axially therein along with the rotor in the rotor housing.

Under static operating conditions the fluid pressure acting against the face of the piston balances the total opposite thrust, chiefly the weight of the rotor. While the piston 48 maintains the rotor at a predetermined axial position within the rotor housing, it simultaneously can support the rotor for substantially friction-free rotational movement. This rotational support may be supplemented by a second piston 50 within a cylinder 55 whose chief function is to serve as a rotor bearing. If the fluid pressure acting against the underside of a piston exceeds the total thrust upon said piston, the piston will be moved axially until the total pressure upon the piston by the pressure fluid again equals the opposite thrust upon the rotor. Inasmuch as the piston and rotor are interconnected, they move together as a unit and a predetermined relationship therebetween is continuously achieved. Fluid pressure within the cylinder 46 may be controlled either manually or automatically to move the piston 48 and attached rotor axially to a predetermined position within rotor housing 34.

If controlled manually a supply valve 56 in line 58 leading to a source of pressure fluid may be opened to admit pressure fluid to the space in the cylinder under the piston and effect movement of the rotor in a direction that opposes its natural thrust. Conversely the supply valve 56 may be throttled or closed completely as may be necessary to curtail the fluid pressure in the cylinder under the piston and thus allow a reverse movement of the rotor as may be effected by leakage past the piston or through a controlled vent.

If controlled automatically a simple supply and exhaust valve may be used to supply pressure fluid from the source through line 58 to the space in the cylinder in response to the axial position of the rotor and the piston 48. Thus a lowering of pressure within the cylinder and against piston 48 would permit the piston to recede under the mass of the rotor and engage the valve operator 54, open the valve 62 and admit therethrough more pressure fluid from its source. As the pressure in the cylinder is so increased the piston in the cylinder is moved against the mass of the rotor until the valve 62 closes and the rotor then achieves its predetermined position within the housing.

By a screw type adjustment of valve seat 64 the valve 62 may be adjusted axially within the housing to achieve a like movement of the piston and attached rotor while the housing itself remains fixed relative thereto.

If a liquid rather than a gaseous medium is used as the pressure fluid in the cylinder it may be advisable to have a pump in the manner shown at 66 of FIGURE 3 to recirculate the leakage fluid from the low to the high pressure sides of the piston. Such a recirculation system might also include a check valve 68 and a switch 70 in the manner shown in the same figure to operate the pump as necessary.

Inasmuch as the rotor positioning device and the rotor support device are both essentially a piston within a fixed cylinder, they may be clearly arranged to simultaneously provide an axial movement and a rotative support to the rotor. Furthermore, the fixed cylinder and the piston therein may be arranged above or below the rotor, or both above and below the rotor with the same or different pressure fluids to achieve the results substantially as disclosed.

Thus while my invention has been described with reference to the arrangement shown in the drawing it is intended that all matter included in the above description or shown in the accompanying drawings shall be interpreted as illustrative only and not in a limiting sense.

I claim:

1. Rotary regenerative heat exchange apparatus having a rotor that includes a cylindrical rotor shell and a central rotor post joined by partitions to comprise a series of compartments for a mass of regenerative heat exchange material, a housing that surrounds the rotor provided at opposite ends thereof with end plates having imperforate portions between spaced apertures that direct a heating fluid and a fluid to be heated through the regenerative heat exchange material carried by the rotor, bearing means supporting the rotor for rotation about its substantially vertical axis, means for rotating the rotor about said axis, and fluid motor means comprising a cylinder having a piston therein movable in response to a change of pressure thereon connected to said rotor post and adapted to move the rotor axially to a predetermined position between said end plates while the rotor is being rotated about its axis.

2. Rotary regenerative heat exchange apparatus having a rotor that includes a cylindrical rotor shell and a central rotor post joined by partitions to comprise a series of compartments for a mass of regenerative heat exchange material, a housing that surrounds the rotor provided at opposite ends thereof with end plates having imperforate portions between spaced apertures that direct a heating fluid and a fluid to be heated through the regenerative heat exchange material carried by the rotor, bearing means supporting the rotor for rotation about its substantially vertical axis, means for rotating the rotor about said axis, and fluid motor means comprising a cylinder concentric with said rotor and a piston within said cylinder axially aligned therewith and separating said cylinder into low and high pressure sides connected to said rotor post and adapted to move the rotor axially to a predetermined position between said end plates while the rotor is being rotated about its axis.

3. Rotary regenerative heat exchange apparatus as defined in claim 1 including pumping means having a source of suction on the low pressure side and point of discharge on the high pressure side of said cylinder whereby fluid leakage past said piston may be recycled from the low to high pressure sides.

4. Rotary regenerative heat exchange apparatus having a rotor that includes a cylindrical rotor shell and a central rotor post joined by partitions to comprise a series of compartments for a mass of regenerative heat exchange material, a housing that surrounds the rotor provided at opposite ends thereof with end plates having imperforate portions between spaced apertures that direct a heating fluid and a fluid to be heated through the regenerative heat exchange material carried by the rotor, a piston connected to said rotor in tension to simultaneously move the rotor axially and support it for rotation about its substantially vertical axis, and means for rotating the rotor about its axis.

References Cited

UNITED STATES PATENTS 3,114,413 12/1963 Nyberg ---------- 165—10 X
3,144,903 8/1964 Stockman ------------ 165—7

ROBERT A. O'LEARY, *Primary Examiner.*

A. W. DAVIS, *Assistant Examiner.*